(12) United States Patent
Smallwood et al.

(10) Patent No.: US 10,261,482 B2
(45) Date of Patent: Apr. 16, 2019

(54) INITIATING ACTIONS ON WEARABLE DEVICES

(71) Applicant: CA, Inc., Islandia, NY (US)

(72) Inventors: Connie Smallwood, Cary, NC (US); Steven L. Greenspan, Scotch Plains, NJ (US)

(73) Assignee: CA, Inc., New York, NY (US)

( * ) Notice: Subject to any disclaimer, the term of this patent is extended or adjusted under 35 U.S.C. 154(b) by 298 days.

(21) Appl. No.: 14/669,181

(22) Filed: Mar. 26, 2015

(65) Prior Publication Data

US 2016/0282824 A1    Sep. 29, 2016

(51) Int. Cl.
| | |
|---|---|
| *G06F 1/16* | (2006.01) |
| *G06F 3/01* | (2006.01) |
| *G02B 27/01* | (2006.01) |
| *G05B 15/02* | (2006.01) |

(52) U.S. Cl.
CPC ........... *G05B 15/02* (2013.01); *G02B 27/017* (2013.01); *G06F 1/163* (2013.01); *G06F 3/011* (2013.01); *G06F 3/012* (2013.01); *G06F 3/013* (2013.01); *G02B 2027/014* (2013.01); *G02B 2027/0138* (2013.01); *G02B 2027/0141* (2013.01)

(58) Field of Classification Search
CPC . G05B 15/02; G06F 1/163; G06F 3/01; G06F 3/011; G06F 3/017; H04W 4/008; H04W 8/005
USPC .......................................................... 340/3.1
See application file for complete search history.

(56) References Cited

U.S. PATENT DOCUMENTS

| | | | | |
|---|---|---|---|---|
| 9,122,321 | B2 * | 9/2015 | Perez ...................... | G06F 3/033 |
| 9,256,071 | B1 * | 2/2016 | Spitzer ................ | G02B 27/017 |
| 2005/0049730 | A1 * | 3/2005 | Adamson ............... | G05B 15/02 |
| | | | | 700/83 |
| 2005/0278462 | A1 * | 12/2005 | Gillespie .......... | H04N 21/43637 |
| | | | | 710/8 |
| 2006/0255963 | A1 * | 11/2006 | Thompson ............. | G08C 17/02 |
| | | | | 340/12.23 |
| 2009/0039164 | A1 * | 2/2009 | Herwig .................. | G07G 1/009 |
| | | | | 235/462.41 |

(Continued)

OTHER PUBLICATIONS

Eyefluence, "Eye-Interaction for HMD's", pp. 1-2, retrieved on Jan. 16, 2015, retrieved from Internet http://eyefluence.com/eyefluence-technology/.

(Continued)

*Primary Examiner* — Quan-Zhen Wang
*Assistant Examiner* — Stephen R Burgdorf
(74) *Attorney, Agent, or Firm* — Meyertons, Hood, Kivlin, Kowert & Goetzel, P.C.

(57) ABSTRACT

A user selects an appliance or other device to control using a wearable computing device, such as an augmented eyewear device, for example. Based on the selection, data regarding a current operating state and one or more subsequent operating states are provided for display to the user. Using the wearable computing device, the user selects one of the subsequent states and controls the appliance to transition from its current state to the selected subsequent state. The commands for controlling the transition may be proxied for the wearable computing device by a mobile device or a network server, for example, via one or more established communication links.

20 Claims, 8 Drawing Sheets

(56) References Cited

U.S. PATENT DOCUMENTS

| | | | | |
|---|---|---|---|---|
| 2009/0326406 | A1* | 12/2009 | Tan | G06F 3/015 600/546 |
| 2013/0069985 | A1* | 3/2013 | Wong | G02B 27/017 345/633 |
| 2014/0002753 | A1* | 1/2014 | Griffin | H04W 88/06 348/734 |
| 2014/0279528 | A1* | 9/2014 | Slaby | H04L 63/0853 705/44 |
| 2015/0106386 | A1* | 4/2015 | Lee | G06F 17/30861 707/748 |
| 2015/0164606 | A1* | 6/2015 | Jacobs | A61B 19/5244 606/1 |
| 2015/0181945 | A1* | 7/2015 | Tremblay | A24F 47/008 131/328 |
| 2015/0281593 | A1* | 10/2015 | Slaby | H04N 5/265 348/164 |
| 2015/0323791 | A1* | 11/2015 | Scheer | G06F 3/0488 345/173 |
| 2015/0348327 | A1* | 12/2015 | Zalewski | G06F 3/01 345/419 |
| 2015/0350031 | A1* | 12/2015 | Burks | H04L 41/22 715/736 |
| 2016/0188861 | A1* | 6/2016 | Todeschini | G06F 21/32 726/7 |
| 2016/0239823 | A1* | 8/2016 | Bengtsson | G06F 1/163 |

OTHER PUBLICATIONS

EyeInfo, "EyeInfo's GlassGaze App Brings Gaze Tracking to Google Glass", pp. 1-8, retrieved on Jan. 16, 2015, retrieved Internet http://glassalmanac.com/eyeinfo-release-glassgaze/5939/.

Slyce, "Visial Search, Image & Product Recognition", pp. 1-9, retrieved on Jan. 16, 2015, retrieved from Internet http://slyce.it/.

Catchoom, "Image Recognition and Augmented Reality", pp. 1-3, retrieved on Jan. 16, 2015, retrieved from Internet http://catchoom.com/.

Shodan, "The Search Engine for the Web", pp. 1-3, retrieved on Jan. 12, 2016, retrieved from Internet http://www.shodan.io/.

Jacob R., "Eye Movement-Based Human-Computer Interaction Techniques: Toward Non-Command Interfaces", Advances in human-computer interaction 4, 1993, pp. 1-58.

Takahashi, D., "CamFind app brings accurate visual search to Google Glass", Sep. 24, 2014, pp. 1-6, retrieved on Sep. 23, 2015, retrieved from Internet http://venturebeat.com.

Alangovan, A., "Nod Drone Control (blog/Nod-Drone-Control)", Jun. 10, 2015, pp. 1-7, retrieved on Jan. 11, 2016, retrieved from Internet https://dev.nod.com/blog/.

* cited by examiner

INITIATING ACTIONS ON WEARABLE DEVICES

BACKGROUND

The present disclosure relates generally to methods for controlling the operation of a user-selected device, and more particularly, to methods for controlling the operation of the user-selected device using a wearable computing device.

Wearable computers, also referred to as body-borne computers or "wearables," are miniature computing devices that are worn by a user. Such devices may be embodied as a pair of glasses, for example, or as a watch or piece of jewelry. In some cases, wearable computers may be incorporated into articles of clothing or into prosthetics.

Regardless of their particular structure, however, wearable computers generally provide instant access to a variety of information, and are increasingly making communications between users and/or various devices more convenient. However, most of today's wearable computing devices require a user to perform a specific action to perform these functions. By way of example, a user may have to click, swipe, or speak a command to initiate or complete a desired task. Some wearable devices are able to detect more subtle movements, such as blinking, or accelerometer-based actions, such as head tilting or hand gestures. However, these actions still require physical effort by the user. In some cases, the user may be in an environment where speaking aloud is not an option, or where they are unable to initiate a basic task due to limited hand movement.

BRIEF SUMMARY

The present disclosure provides a computer-implemented method, an apparatus, and a corresponding computer-readable storage medium for classifying a device, such as a home appliance, using a wearable computer device, and for controlling a state transition of the device using the wearable computing device. Such wearable computing devices may comprise any device known in the art that is worn by a user. However, for illustrative purposes only, the wearable computing device comprises, in some embodiments, an augmented eyewear device.

Accordingly, one embodiment of the present disclosure provides a computer-implemented method comprising classifying a device to be controlled by a user. The device is selected by the user via a wearable computing device and is positioned within a field of view of the user. Once selection is accomplished, the method comprises querying the device for device state information. The device state information comprises information that indicates a current operating state for the device and a subsequent operating state for the device. The method then comprises receiving the device state information from the device, and sending the device state information to the wearable computing device. The device state information configures the wearable computing device to control a transition of the device selected by the user from the current operating state to the subsequent operating state.

In another embodiment, the present disclosure provides a computing device comprising a communication interface and a processing circuit. The communication interface is configured to communicate with a wearable computing device worn by a user, and with a device to be controlled by the user via the wearable computing device. The processing circuit is configured to query the device for device state information, wherein the device state information comprises information indicating a current state for the device and a subsequent state for the device, receive the device state information from the device, and send the device state information to the wearable computing device. The device state information configures the wearable computing device to control a transition of the device selected by the user from the current operating state to the subsequent operating state.

The present disclosure also provides a computer-readable storage medium comprising computer program code stored thereon that, when executed by a processing circuit of a computing device, configures the processing circuit to query a user-selected device for device state information, wherein the device state information indicates a current state for the device and a subsequent state for the device. The computer program code also configures the processing circuit to receive the device state information from the device, and upon receipt, send the device state information to a wearable computing device worn by the user. The device state information configures the wearable computing device to control a transition of the device from the current state to the subsequent state.

Of course, those skilled in the art will appreciate that the present embodiments are not limited to the above contexts or examples, and will recognize additional features and advantages upon reading the following detailed description and upon viewing the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Pen, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Accordingly, the present disclosure provides a device, a computer-implemented method, and a corresponding computer-readable storage medium for controlling a device, such as a home appliance, for example, using a wearable computer device, such as augmented eyewear, for example. More particularly, embodiments of the present disclosure classify selected devices that are in a user's field of view. A device may be selected, for example, when the user fixes his or her gaze on the device for some predetermined period of time (e.g., 3 seconds), or by performing some predetermined action (e.g., blinking, depressing a button, etc.) to indicate to the wearable computer to select the desired device. Once selected, state information about the selected device is obtained either from a network server or from the device itself. Such information will include, but is not limited to, a current state of the selected device as well as information detailing one or more subsequent states that the device may enter. Once the state information is known, the wearable device can control the selected device to transition from the current state to a subsequent state.

Figure 1:
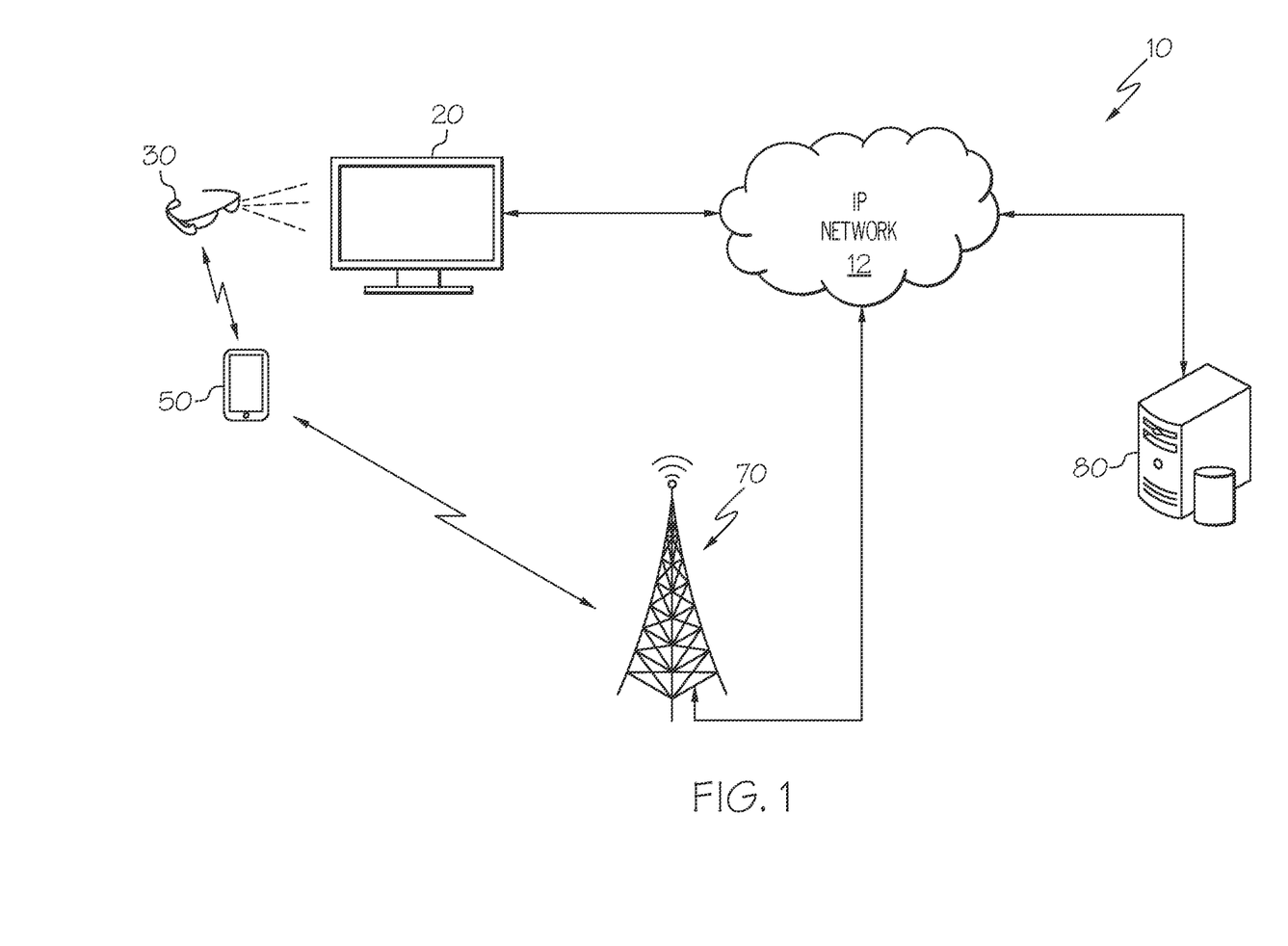
FIG. 1 is a block diagram illustrating a system configured for controlling the operation of a device, such as a home appliance, according to one embodiment of the present disclosure.

Turning now to the drawings, FIG. 1 is a block diagram illustrating a system 10 configured according to embodiments of the present disclosure. As seen in FIG. 1, system 10 comprises an IP network 12, a physical device to be controlled, such as a home appliance (e.g., television 20), a wearable computing device 30, a mobile device 50, a wireless communications system 70, and a network-based computer server 80. In accordance with various embodiments of the present disclosure, a user wearing the wearable computer 30 can control the television 20 to transition from a current operating state to a subsequent operating state based on state information obtained about the television 20.

In more detail, network 12 may comprise, for example, the Internet. To that end, network 12 comprises the various physical gateways, routers, and other well-known physical nodes to communicatively connect the television 20 with the network server 80. Network 12 may facilitate communications between these devices using any protocol known in the art; however, in one embodiment, network 12 communicates data packets between television 20 and network server 80 in accordance with the well-known TCP/IP protocol.

Additionally, as seen in FIG. 1, network 12 may also comprise an interface that communicatively connects IP network 12 to the physical nodes of a wireless network 70. The hardware and software required for such a connection is well-known in the art, and thus, not described in detail here. However, it is enough to understand that the connection between network 70 and network 12 may utilize any protocol known in the art to facilitate the communication of data and commands between a mobile device 50 (e.g., a cellular device) and one or both of the television 20 and server 80. More particularly, as described in more detail later, the mobile device 50 will function as a proxy for the wearable computing device 30 I some embodiments. To that end, mobile device 50 will receive information about the operational states of television 20 via network 70, as well as send one or more commands generated by the wearable computing device 30 to control the operation of television 20 via network 70. In more detail, such commands will control the television 20 (either directly or via server 80) to transition from its current operating state to a selected operating state.

The television 20 in FIG. 1 represents any physical device that may be controlled according to the present disclosure. As seen later in more detail, such devices comprise various home appliances, but may also comprise other devices that are not typically considered "appliances." Thus, the present disclosure does not require a device under control to be a "home appliance," much less an "appliance."

However, for the sake of illustration, television 20 comprises any television known in the art that is capable of communicating via a packet data network such as network 12. To that end, television 20 may comprise an interface (e.g., an Internet connection) that facilitates the communication of state information regarding its current state, as well as one or more subsequent states, to the network server 80. For example, television 20 may receive a message from network server 80 requesting the television 20 to report its current operating state. In response, television 20 may send a response message indicating that it is currently tuned to a specific channel or configured for a specific sleep time.

Additionally, television 20 may receive a message from network server 80 requesting that television 20 identify one or more subsequent operating states to which television 20 may transition. In response, television 20 could report, in a return message, information indicating those one or more subsequent operating states. By way of example only, such subsequent states include, but are not limited to, a "channel guide state" in which a channel guide is displayed to a user, a "channel state" in which the user can tune the television 20 to another specified channel, a "program selection state" in which the user may select a particular movie or sports event to watch, and a "configuration state" in which the user can modify the current configuration of the television 20. Of course, these particular states are merely illustrative and not limiting as any state that is needed or are also possible.

The wearable computing device 30, in this embodiment, comprises an augmented eyewear device such as a GOOGLE GLASS, for example, that is worn on the user's head. Such wearable devices 30, are well-known in the art, and thus, not described in great detail here. However, it should be stated that a wearable computing device 30 configured to operate with embodiments of the present disclosure comprises a visual overlay that displays information to a user, a user interface that includes a camera for capturing images and video, a microphone for capturing audible sound, and a speaker for rendering audible sound to the user.

In addition to the audio/video capabilities, a wearable computing device 30 configured according to the present disclosure may also comprise a processor circuit capable of executing application programs, and a communications interface circuit that is able to transmit and receive data with a variety of remote devices via a wireless radio interface. Such devices include, as seen in FIG. 1, a user's mobile device such as mobile device 50, but may also include television 20. In the absence of such a processor circuit, the wearable computing device 30 may employ the processing circuit that is part of some other device, such as mobile device 50.

Mobile device 50 may comprise any mobile communications device known in the art. Some examples of suitable mobile devices 50 include, but are not limited to, cellular telephones and various types of computing devices, such as tablet computers, notebook and laptop computers, desktop computers, and the like. According to the present disclosure, mobile device 50 may communicate with the wearable computing device 30 via a short-range radio communications protocol, such as the well-known BLUETOOTH protocol, for example, and brokers communications between the wearable computing device 30, television 20, and the network server 80. Communications between the wearable computing device 30 and the mobile device 50, as well as between the wearable computing device 30 and the network server 80, may be realized using protocols, messaging, and signaling that is well-known in the art.

Figure 2:
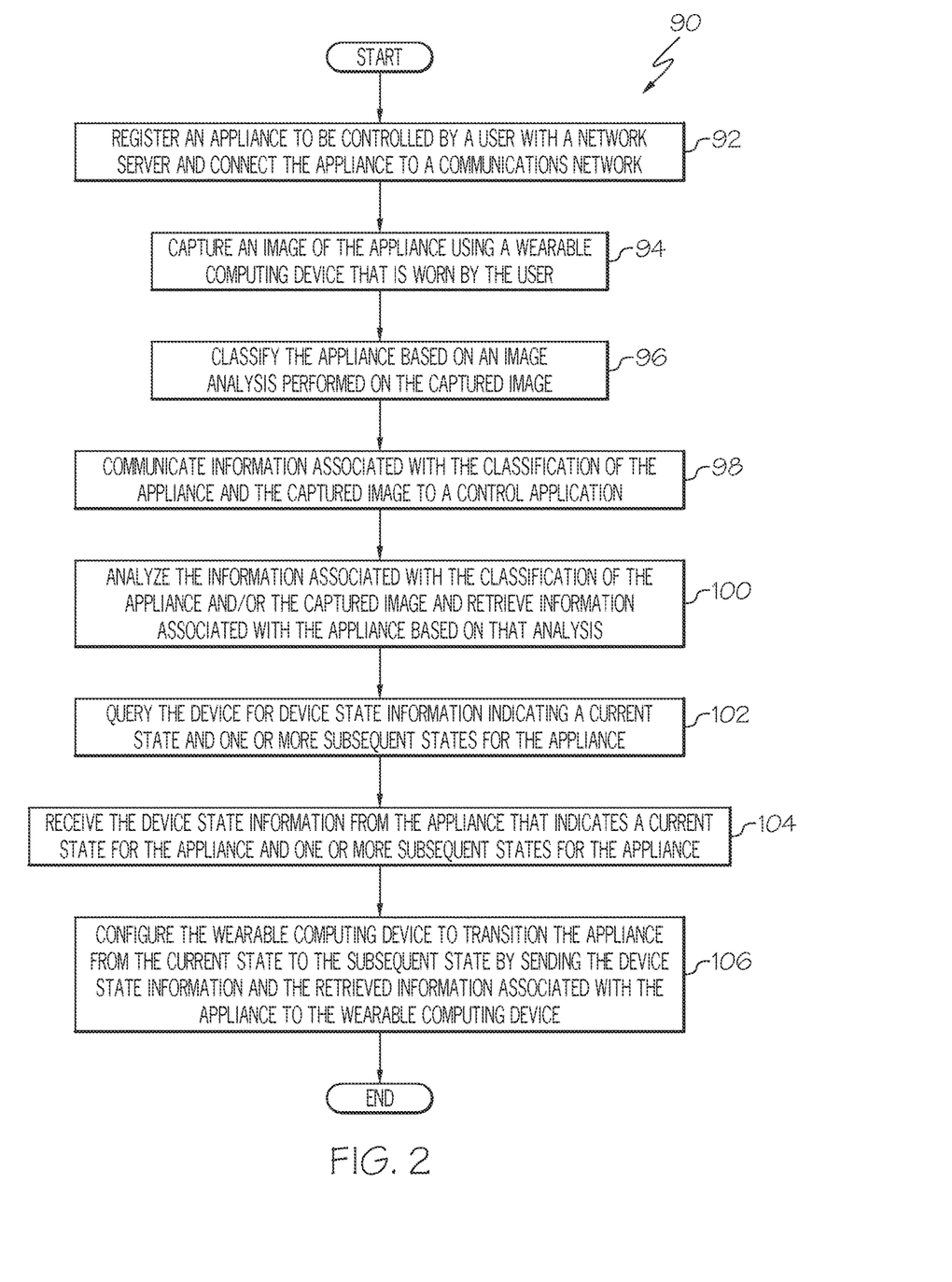
FIG. 2 is a flow diagram illustrating a method for controlling the operation of a device, such as a home appliance, according to one embodiment of the present disclosure.

FIG. 2 illustrates a method 90 for controlling the transition of the television 20 from a current operating state to a new, user-selected operating state using the wearable computing device 30. Particularly, as a pre-requisite, the television 20 is registered with the network server 80 and has a persistent connection to the IP network 12 (box 92). Registration may, for example, comprise providing information about the television 20 to the network server 80 for storage in a database or other physical memory circuit. Such information may comprise, but is not limited to, data identifying a make and model of the television 20, the capabilities of television 20, a current configuration of television 20, a serial number or other unique identifier for television 20, user-related information (e.g., name, address, etc.), a URL or other address of another server device (e.g., a manufacturer's server) that stores additional information related to the television, and the like.

Once registered, a user may control the operation of the television 20, and more particularly, the transition of television 20 between operating states using a wearable computing device 30 configured according to the present disclosure. To accomplish this, the user needs only to focus on television 20 while wearing the wearable computing device 30, and perform an action to control a camera associated with the wearable computing device 30 to capture an image of television 20 (box 94). Such actions may be, for example, an eye blink, a button actuation, a voice command, or simply the user's sustained fixed gaze on television 20 for a predefined period of time (e.g., 3 seconds). Other user initiated actions, whether those actions are "passive" (e.g., the user's sustained focus on an object) or "active" (e.g., the user depressing a control button), are also possible.

The captured image is then used by the wearable computing device 30 to classify the television 20 (box 96). The classification process need not be complex, as the processing abilities of the wearable computing device 30 may be limited; however, it is adequate for the wearable computing device 30 to determine, for example, one or more of a type of appliance for television 30, a make and/or model for television 30, a serial number for the television 30, and the like.

The classification information, which may or may not be accompanied by additional data, is then sent by the wearable computing device 30 to a control application executing at the network server 80 (box 98). In this embodiment, the information is sent to the network server 80 via mobile device 50, which acts as a proxy for the wearable computing device 30. However, as seen in more detail later, other paths for communicating such information readily exist.

Upon receipt, the control application at network server 80 analyzes the data and information, and then based on the analysis, retrieves information associated with the television 20 (box 100). The retrieved information may include, for example, the data provided as part of the registration process, as well as any other information about the television that can be obtained from other, possibly third-party servers. The network server 80 will then query the television 20 to request its current operating state, and one or more subsequent operating states to which the television 20 may transition (box 102). Upon receipt of the information from the television 20 (box 104), the network server 80 will return the information received from the television 20, as well as that retrieved from the database, to the wearable computing device 30 in a return message via mobile device 50. This information will configure the wearable computing device 30 to display the subsequent operating states received from the television 20 to allow the user to select one of the states. Once selected, the wearable computing device 30 will generate and send the appropriate commands to transition the television 20 from its current operating state to the selected operating state selected (box 106).

Thus, according to embodiments of the present disclosure, users equipped with such a wearable computing device 30 are able to control an appliance or other device merely by focusing on the appliance. Further, there is no need for the user to maintain the various installation and user guides that are typically associated with such appliances since most or all that information may be retrieved from one or more network-based servers on an "as-needed" basis. Additionally, by maintaining such information "on-line," a user can be assured that the information received from the network server 80 is up-to-date.

Figure 3:
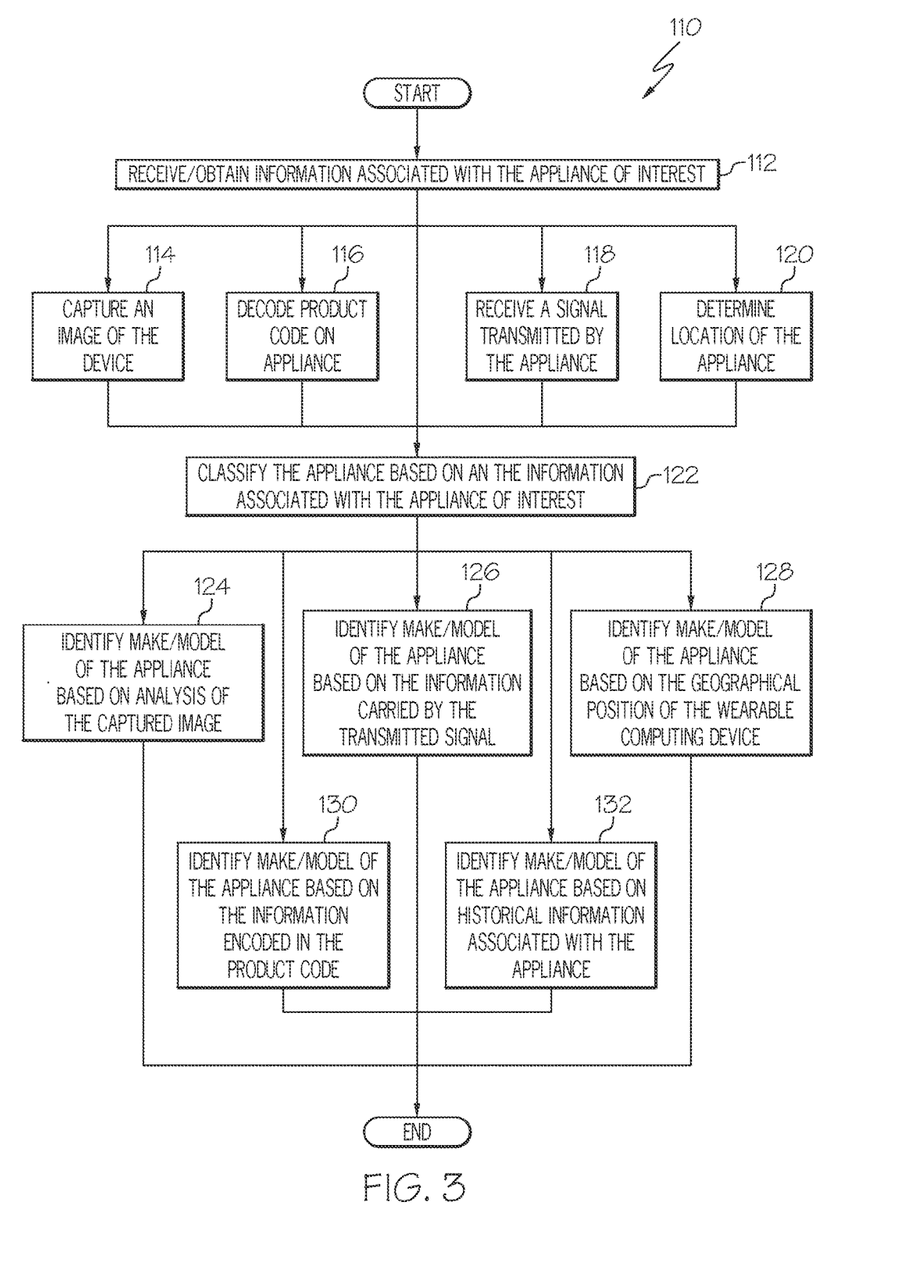
FIG. 3 is a flow diagram illustrating a method for classifying a device, such as a home appliance, according to embodiments of the present disclosure.

As previously described, the wearable computing device 30 is configured to obtain information about television 20 for classification purposes. However, as seen in FIG. 3, there are various ways to obtain this data (boxes 112, 114, 116, 118, 120), and various ways to use that data to classify the television 20 (boxes 122, 124, 126, 128, 130, 132).

For example, as previously described, many wearable computing devices 30 are equipped with a camera. In such embodiments, the camera may be controlled by the user to capture an image of the television 30 (box 114). Then, to classify the television 20 (box 122), the captured image could be analyzed and processed using any of a number of well-known techniques, and compared to a set of images of known (or registered) televisions. Based on that comparison, the wearable computing device 30 could classify television 20 by identifying its make and model (box 124), for example, as well as other information.

In another embodiment, the television 20 could have a product code (e.g., a bar code or a QR code) affixed thereon. In this embodiment, the user may control the wearable computing device 30 to capture an image of the product code. An application program executing on the wearable computing device 30 may then decode the product code (box 116), and then utilize the decoded information to classify the television 20 (box 122). For example, the wearable computing device 20 may compare the decoded data to information stored in a memory circuit to identify the make and model information for the television 20 (box 130).

In another embodiment, the wearable computing device 30 and the television 20 may each comprise a corresponding radio interface, such as a short-range BLUETOOTH transceivers. As is known in the art, BLUETOOTH transceivers may be configured to detect other BLUETOOTH transceivers in close proximity, and to establish a communications link upon such detection. Thus, once the wearable computing device 30 comes within a predetermined distance of television 20, the television 20 could provide the wearable computing device 30 with data (e.g., make, model, serial number, and the like) (box 118), which is then used to classify the television 20 (boxes 122, 126).

In yet another embodiment, classification of the television 20 is based on the location of the television 20. Particularly, the geographic coordinates of the television 20 could be provisioned as part of the registration process for television 20, and be associated with information that classifies television 20. For example, the coordinates of the television 20 may be stored with the other information identifying the television 20 in a storage device. Additionally, in one embodiment, the wearable computing device 30 is equipped with a Global Positioning Satellite (GPS) mechanism that is able to determine its location using any of a variety of well-known methods. In cases where the wearable computing device 30 does not have GPS capabilities, it may be configured to obtain its current position using the GPS capabilities of another co-located device (e.g., mobile device 50).

Regardless of how the wearable computing device 30 determines its location, however, wearable computing device 30 can compare that location to the pre-provisioned location of television 20, and classify the television (e.g., identify the make and model of television 20) based on that location information (boxes 122, 128).

In addition to the above, the present disclosure also contemplates an embodiment in which information used to classify a given appliance such as television 20 comprises historical data. In more detail, data associated with the television 20 may be "learned" and stored over time in a memory circuit accessible to the wearable computing device 30. For example, the data and information obtained about television 20 may be stored by the wearable computing device 30 in a memory circuit each time the user selects television 20 for control using the wearable computing device 30. Thereafter, embodiments of the present disclosure may consult this historical information to classify television 20 by identifying, for example, its make and model (boxes 122, 132).

Of course, the present disclosure is not limited to the use of only one of the methods described above (boxes 114, 116, 118, 120) to obtain or receive information associated with the television 20 for classification purposes. Nor is the present disclosure limited to the use of only one of the methods of classification (i.e., boxes 124, 126, 128, 130, 132). In some embodiments, the wearable computing device 30 utilizes multiple such methods (boxes 114, 116, 118, 120) to obtain information about the television 20, as well as multiple methods (boxes 124, 126, 128, 130, 132) to classify the appliance such as television 20.

For example, one embodiment of the wearable computing device 30 may capture an image of television 20 (box 114) as well as determine its physical geographical location (box 120). The wearable computing device 30 may then identify the make and model of the television 20 based on an image analysis of the captured image (box 124), and compare the geographical location to the location stored in memory (box 128). Since many different makes and models have a similar appearance, the location comparison may help the wearable computing device 30 to more accurately classify the appliance.

Additionally, in some embodiments, notifications are also generated and displayed to the user on wearable computing device 30. Such notifications may indicate, for example, the success or failure of a device to classify the television 20. Additionally, such notifications may be accompanied by information and data about the television 20, such as its serial number, IP address, location, identifiers, and other data as needed or desired. This information may be useful for the user to know, for example, and/or may be used in controlling television 20.

Figure 4:
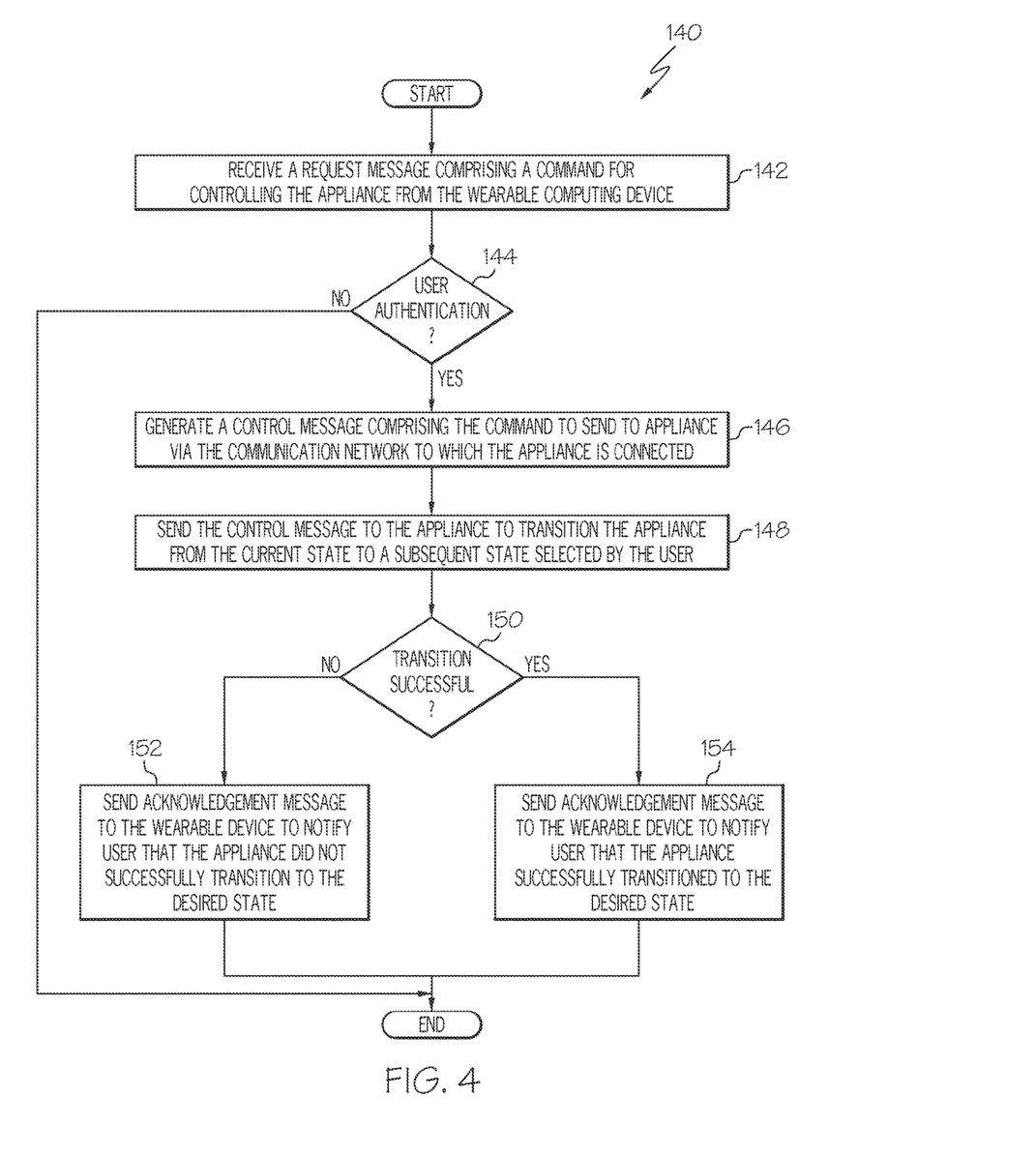
FIG. 4 is a flow diagram illustrating a method for controlling a device, such as a home appliance, to transition between operating states according to one embodiment of the present disclosure.

In addition to the above, embodiments of the present disclosure also provide a method 140 for authenticating the user to control the transition of the television 20. Such a method could help to prevent an unauthorized user from controlling an appliance or device against the desires of the owner of the appliance of device.

Particularly, as previously stated, once an appliance such as television 20 has been classified, the user is presented with information regarding one or more operational states to which the television 20 may transition from its current operational state. The user may then select a desired operating state using, for example, an eye blink or other such method, and cause the wearable computing device 30 to generate an appropriate command for the selected state. The command is then sent to the network server 80 via mobile device 50 so that network server 80 can control television 20 in accordance with the user's selected command.

To that end, method 140 of FIG. 4 begins with the network server 80 receiving a request message from the wearable computing device 30 to control the television 20 (box 142). The request message may include a command and/or other information associated with transitioning the television 20 from its current state to the selected state. Upon receipt of the request, network server 80 will authenticate the user (box 144). Any authentication method known in the art may be utilized. If authentication fails, method 140 ends without controlling the television 20. However, if authentication succeeds (box 144), the network server 80 will generate a control message to send to the television 20 (box 146). The control message may comprise, for example, the command or commands required to transition television 20 to the selected state, and is sent to the television 20 via IP network 12. Upon receipt, the television 20 transitions its operational state to the selected operational state in accordance with the command as previously described (box 148).

Network server 80 may then receive an indication from the television 20 as to whether the transition was a success, or whether the transition failed. If the transition failed (box 150), network server 80 may send a notification to the wearable computing device 30 indicating that the transition failed (box 152). Otherwise, an acknowledgement notification may be sent to the wearable computing device indicating the success of the transition (box 154). In either case, the result of the transition may be displayed by the wearable computing device 30 to the user.

Figure 5A:
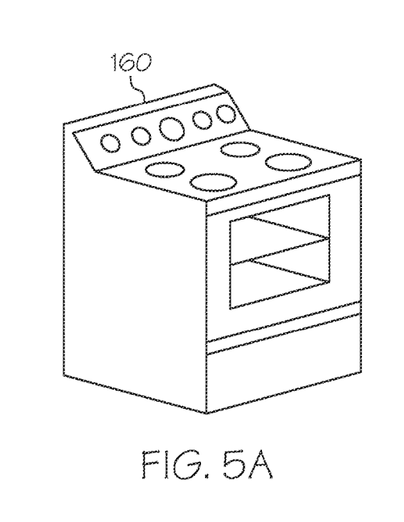
FIGS. 5A-5C are perspective views of some exemplary devices that are suitable to be controlled according to one or more embodiments of the present disclosure.
Figure 5B:
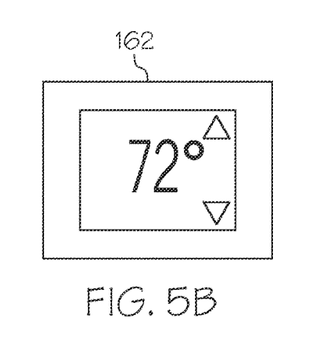
Figure 5C:
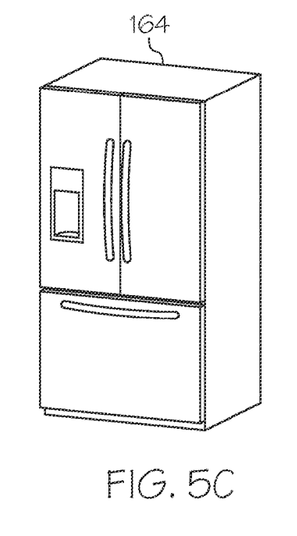

As stated previously, the present disclosure is not limited to any specific appliance, or to any particular class or type of devices. Rather, the present disclosure may be applied to control many different types of devices. FIGS. 5A-5C, for example, illustrate some other appliances and devices that are controllable by a user in accordance with one or more of methods 90, 110, and 140 above.

In more detail, FIG. 5A illustrates an oven 160. In some embodiments, the user may control the oven 160, as previously described, to turn the oven 160 "ON" or "OFF," to "PRE-HEAT" to a desired temperature, which may be selected by the user from a list of temperatures displayed by the wearable computing device 30, to enter a "BROIL" or "BAKE" mode, and the like.

Similarly, FIG. 5B is a perspective view illustrating a thermostat device 162. In these embodiments, the user may control the thermostat 162, as previously described, to raise or lower a temperature, or to configure thermostat 162 such that it controls an environmental unit (e.g., an HVAC unit or other heating/air conditioning system) to turn on/off at specific times of the day. In each case, the user could select or define a temperature, a date/time constraint, or simply a "+/−" indicator, from a set of commands displayed by wearable computing device 30 to the user. This would allow the user to maintain a comfortable temperature for a given room or zone, and further, to place time-based constraints on the operation of the heating and/or air conditioning system.

FIG. 5C is a perspective view illustrating a refrigerator 164. According to some embodiments, the user may control the refrigerator 164 identify a list of products currently stored therein, as well as identify a list of products that need replenishing (e.g., milk, eggs, etc.). Additionally, the user may employ the wearable computing device 30, as described above, to configure the operation of the refrigerator 164. Such controls include, but are not limited to, the temperature of the refrigerator 164. Thus, in accordance with embodiments of the present disclosure, the user can identify the current contents of a refrigerator, as well as what needs replenishing, and control the operation of the refrigerator 164 without having to open the doors of the refrigerator.

Of course, other appliances and devices may be controlled by the user in accordance with one or more of the above-described methods 90, 110, 140. All that is needed by the appliance or the device, at least in the embodiments described above, is a communications connection established with an application server (e.g., network server 80) over which it can receive commands issued by the wearable computing device 30.

Figure 6:
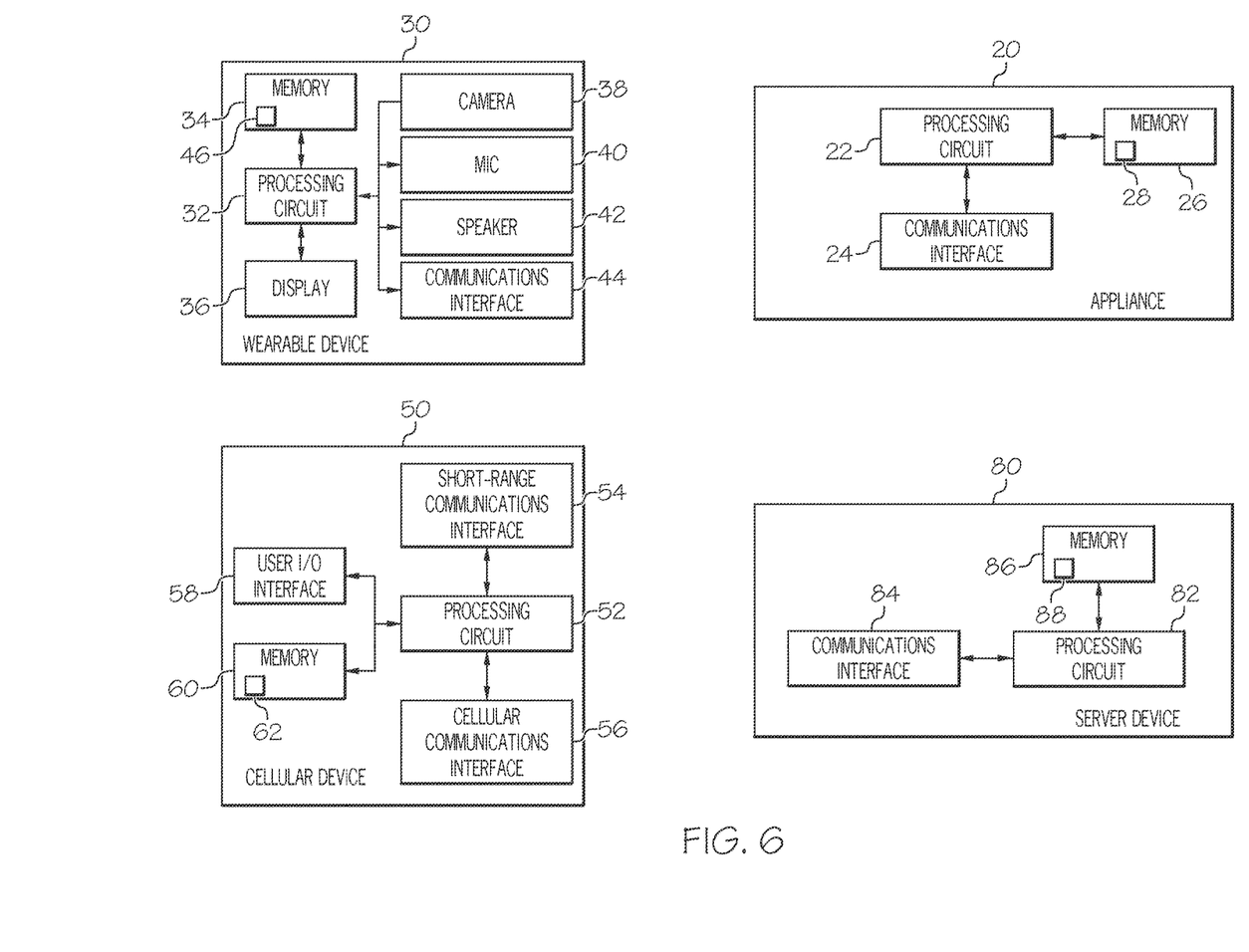
FIG. 6 is a block diagram illustrating some of the functional components of the devices configured to control the transition of a device, such as a home appliance, according to one embodiment of the present disclosure.

FIG. 6 is a block diagram illustrating some of the functional components of the devices configured to control the transition of a device, such as television 20, according to one embodiment of the present disclosure.

Television 20 comprises a processing circuit 22, a communications interface 24, and a memory circuit 26 that stores a control application program 28. The processing circuit 22 may be implemented by one or more microprocessors, hardware, firmware, or a combination thereof, and generally controls the operation and functions of television 20 according to logic and instructions stored in the memory circuit 26. Such operations and functions include, but are not limited to, communicating data and information with the network server 80 via communications interface 24, as well as one or more conventional functions, such as changing channels, for example, responsive to commands received from network server 80. Additionally, processing circuit 22 is configured to execute the instructions and code of control application program 28 to configure television 20 to function according to the embodiments previously described.

The communications interface 24 may comprise any communication circuitry known in the art that enables television 20 to communicate data and information with the network server 80. For example, the communications interface 24 in one embodiment comprises a physical ETHERNET card that operates according to any of the standards defining the well-known ETHERNET protocol. However, other protocols and standards are also possible with the present disclosure.

For example, in some embodiments of the present disclosure, which are seen later in more detail, the communications interface also comprises a short-range radio transceiver that is able to communicate directly with corresponding short-range transceivers in one or both of the wearable computing device 30 and the mobile device 50. In these embodiments, there may be no need for the network server 80 to perform the functions described above, as they may be performed by one or both of the wearable computing device 30 and the mobile device 50. At any rate, for embodiments where communications interface 24 does comprise such a short-range transceiver, it functions according to any of a variety of well-known protocols, such as BLUETOOTH or WiFi.

The memory circuit 26 may comprise any non-transitory, solid state memory or computer readable media known in the art. Suitable examples of such media include, but are not limited to, ROM, DRAM, Flash, or a device capable of reading computer-readable media, such as optical or magnetic media. The memory circuit 26 stores programs and data, such as control application program 28. When executed by the processing circuit 22, control application program 28 configures the processing circuit 22 of television 20 to perform the functions previously described according to the embodiments of the present disclosure.

Wearable computing device 30 also comprises multiple functional components including a processing circuit 32, a memory 34, a display 36, a camera 38, a microphone 40, a speaker 42, and a communications interface 44. The display 36, camera 38, microphone 40, and speaker 42 are conventional circuits whose functions are well-known in the art. Therefore, those components are not described further here.

The processing circuit 32, however, is configured to control the operation of the wearable computing device 30 in accordance with the embodiments of the present disclosure. To that end, processing circuit 32 may also be implemented by one or more microprocessors, hardware, firmware, or a combination thereof. In this embodiment, the logic and instructions defined by the control application program 46 stored in memory 34 will configure the processing circuit 32 to function as previously described. More specifically, in addition to controlling the conventional functions of an augmented eyewear device, the control application program will configure the processing circuit 32 to select a device within the user's field of vision based on user input, communicate information and data with the mobile device 50 via communications interface 44, display information obtained about the device on display 36, and select a command for controlling a selected device such as television 20 in accordance with the user input.

The memory circuit 34 also comprises any non-transitory, solid state memory or computer readable media known in the art such as ROM, DRAM, Flash, or a device capable of reading computer-readable media, such as optical or magnetic media. The memory circuit 34 stores programs and data, such as control application program 46 that, when executed by processing circuit 32, configures the processing circuit 32 to perform the functions previously described in accordance with the embodiments of the present disclosure.

The communications interface 44 comprises a short-range transceiver that operates, for example, according to a well-known protocol such as BLUETOOTH or WiFi. Generally, the communications interface 44, under the control of processing circuit 32, transmits and receives data and information regarding television 20 to and from mobile device 50. Such data and commands allow the user of wearable computing device 30 to select television 20, obtain data about television 20, and as stated above, generate one or more commands to control the transition of television 20 using the mobile device 50 and the network server 80 as proxies. Additionally, as seen in later embodiments, communications interface 44 may communicate directly with the television 20 by transmitting and receiving the commands and data directly with television 20.

The mobile device 50, as stated above, may comprise any portable communications device known in the art. Such devices include, but are not limited to, smartphones, tablet computing devices, laptop computers, desktop computers, and the like. As seen in FIG. 6, the mobile device 50 comprises such components as a processing circuit 52, a short-range communications interface 54, a cellular communications interface 56, a user I/O interface 58, a memory 60, and a control application program 62.

The components that comprise the mobile device 50 are hardware circuits that are controlled by software programs to perform the functions previously described. More particularly, processing circuit 52, which may be implemented by one or more microprocessors, hardware, firmware, or a combination thereof, is configured to execute the control application program 62. Under the control of control application program 62, the processing circuit 52 communicates the previously described commands and data with the wearable computing device 30 via the short-range communications interface (e.g., a BLUETOOTH or WiFi interface), as well as with the network server 80. By way of example, the mobile device 50 is configured to function as a proxy for the wearable computing device 30 by providing that device with information it needs to display to a user, and by communicating the commands generated by the wearable computing device 30 to the network server 80 so that the server 80 can use them to control the transition of television 20 between desired operating states.

Memory circuit 60 also comprises any non-transitory, solid state memory or computer readable media known in the art such as ROM, DRAM, Flash, or a device capable of reading computer-readable media, such as optical or magnetic media. As seen in FIG. 6, memory circuit 60 stores programs and data, such as control application program 62 that, when executed by processing circuit 52, configures the processing circuit 32 to perform the functions previously described.

The cellular communications interface 56 comprises radio circuitry configured to communicate data and information to network server 80 via network 70. As such, the cellular communications interface may function according any of a variety of well-known communications standards including, but not limited to, those associated with Long Term Evolution (LTE), Evolved-Universal Terrestrial Radio Access (E-UTRA), Worldwide Interoperability for Microwave Access (WiMAX), Universal Terrestrial Radio Access (UTRA), Wideband Code Division Multiple Access (WCDMA), GSM, Ultra Mobile Wideband (UMB) or any other wireless communication system using technologies that perform adaptation between different forms of transmission and use multiple antennas.

The network server 80 comprises a computing device having a processing circuit 82, a communications interface 84, and a memory 86 storing a control application program 88. Each of these components may be implemented as hardware circuitry in a manner that is similar to the hardware circuitry above. Thus, the processing circuit 82 is configured to execute the control application program 88. When executing, the program 88 configures the network server 80 to receive from mobile device 50 requests for data about a particularly identified appliance or device, such as television 20, obtain that data from a knowledgebase or database, for example, and send it to mobile device 50. Additionally, under the control of control application 88, processing circuit 82 is configured to send one or more commands to the television 20 to cause the television to transition between operating states, as previously described. As such, the communications interface 84 comprises, for example, an ETHERNET-based interface that allows the network server 80 to communicate with other devices via IP network 12.

The previous embodiments describe the present disclosure in the context of a network server 80 controlling the state transition of television 20 in accordance with commands and data generated at the wearable computing device 30. However, the present disclosure is not so limited. Other hardware and device configurations are also contemplated by the present disclosure.

Figure 7:
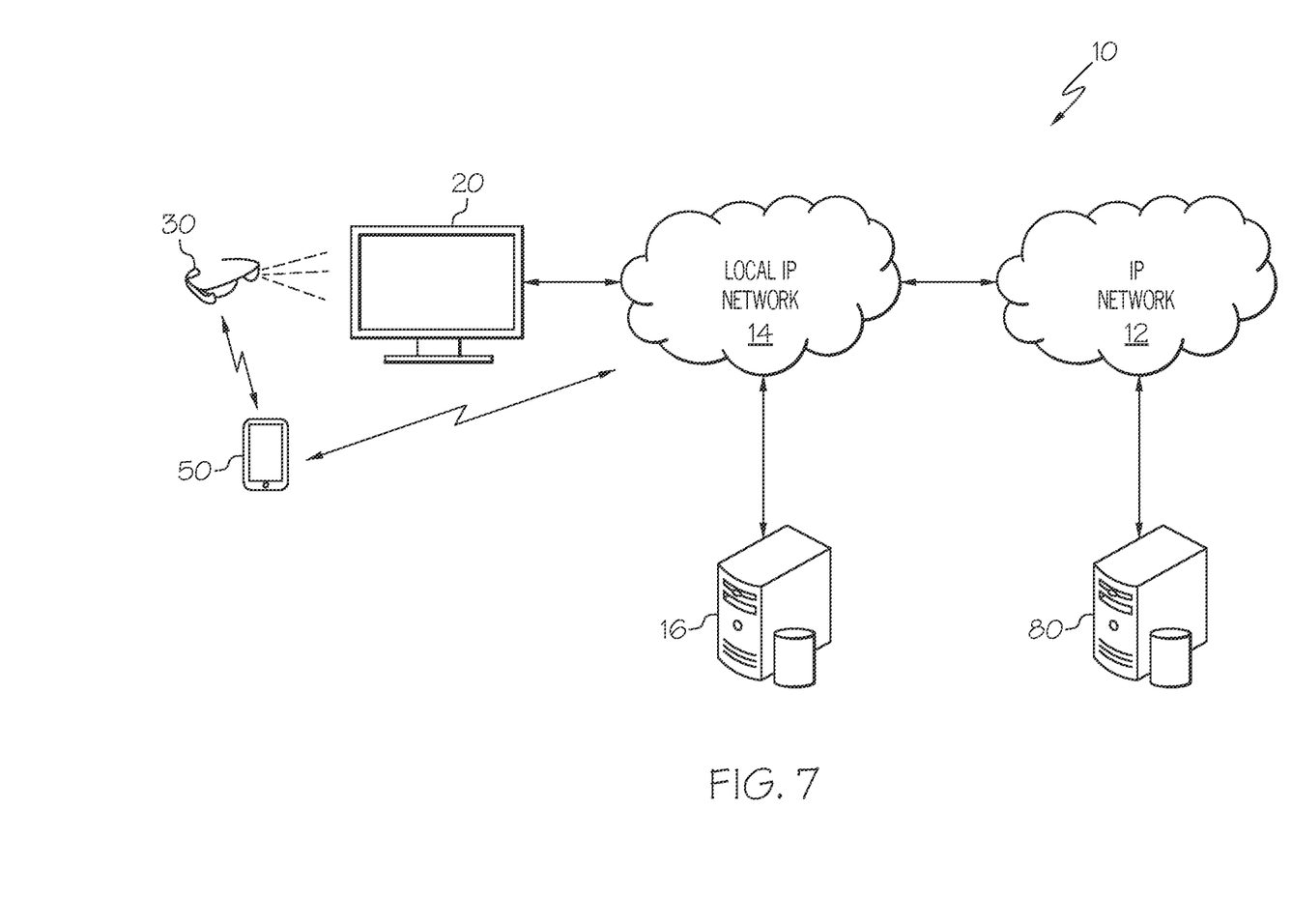
FIG. 7 is a block diagram illustrating a system configured for controlling the operation of a device, such as a home appliance, according to another embodiment of the present disclosure.

By way of example only, FIG. 7 illustrates the functional components of "home network" embodiment. More particularly, a home network of a user may comprise a local server 16 and an IP-based local network 14. These components may communicate with both the mobile device 50 and the network server 80, but perform the functions of the proxy rather than network server 80.

In more detail, the mobile device 50 may communicate with the local server 16, which in turn, performs the data retrieval and command functions previously described with respect to network server 80. Thus, the functional role of the network server 80 in this embodiment is greatly reduced. Instead, in these types of embodiments, network server 80 may function as a data storage device and command proxy.

Further, this particular embodiment helps to prevent or mitigate any problems that may be associated with network latency. In some embodiments of the present disclosure, the local server 16 has access to the data and information needed to perform the embodiments of the present disclosure, and only needs to consult network server 80 to retrieve needed data and information on a limited basis.

Figure 8:
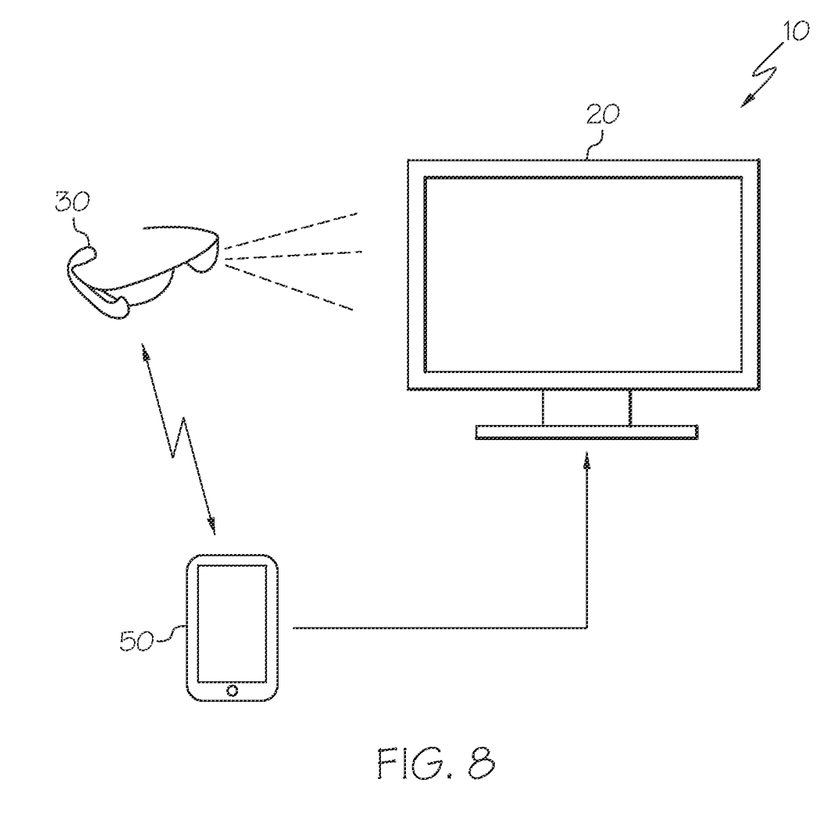
FIG. 8 is a block diagram illustrating a system configured for controlling the operation of a device, such as a home appliance, according to yet another embodiment of the present disclosure.

FIG. 8 illustrates another embodiment in which no network server 80 or local servers 16 are needed. In this embodiment, the mobile device 50 performs the functions of the network server 80. That is, upon determining a classification for the television 20, the mobile device 50 can provide that data to the wearable computing device 30 and receive a command from the wearable computing device to control the transition of the television 20 between operating states, as previously described.

The present embodiments may, of course, be carried out in other ways than those specifically set forth herein without departing from essential characteristics of the disclosure. For example, it should be noted that the flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, to blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A computer-implemented method comprising:
   classifying, by a mobile device, a physical device to be controlled by a user, wherein the physical device is selected by the user via a wearable computing device and is positioned within a field of view of the user, wherein the wearable computing device is not configured to determine its own geographical location, and wherein classifying the physical device to be controlled comprises:
   determining a geographical location for the mobile device co-located with, and communicatively connected to, the wearable computing device;

comparing the geographical location for the mobile device to a pre-provisioned geographical location for the physical device; and classifying the physical device to be controlled based on a result of the comparing;

authenticating, by the mobile device, the user wearing the wearable computing device to control the physical device selected by the user;

querying, by the mobile device, the physical device for device state information;

receiving, by the mobile device, the device state information from the physical device, wherein the device state information comprises information indicating a current state for the physical device and a plurality of user-selectable subsequent states for the physical device, the plurality of user-selectable subsequent states comprising:

a configuration state for modifying a current configuration setting of the physical device; and one or more operating states for controlling a current operational mode of the physical device;

sending, by the mobile device, the device state information to the wearable computing device, wherein the device state information configures the wearable computing device to control a transition of the physical device selected by the user from the current state to the configuration state; and in response to determining that the transition of the physical device to the configuration state has failed, sending notification information to the wearable computing device.

2. The computer-implemented method of claim 1 wherein classifying the physical device to be controlled by a user further comprises:

receiving an image of the physical device captured by a camera associated with the wearable computing device;

performing an image analysis on the captured image; and classifying the physical device based on both a result of the image analysis and on the determined geographical location of the mobile device.

3. The computer-implemented method of claim 1 wherein classifying the physical device to be controlled by a user further comprises classifying the physical device based on a product code associated with the physical device.

4. The computer-implemented method of claim 1 wherein classifying the physical device to be controlled by a user further comprises classifying the physical device based on information carried by a signal transmitted by the physical device.

5. The computer-implemented method of claim 1 further comprising storing the device state information as historical data in a memory circuit each time the user selects the physical device to be controlled via the wearable computing device.

6. The computer-implemented method of claim 5 wherein classifying the physical device further comprises comparing the device state information received from the physical device to previously stored historical data associated with devices that have been previously identified.

7. The computer-implemented method of claim 1 wherein the method further comprises:

receiving a request message comprising a control command from the wearable computing device, wherein the control command is based on one or both of the device state information and the notification information; and responsive to successfully authenticating the user:

generating a control message comprising the control command; and transitioning the physical device selected by the user from the current state to the configuration state, wherein transitioning the physical device selected by the user from the current state to the configuration state comprises sending the control message comprising the control command to the physical device via a communications network.

8. The computer-implemented method of claim 7 further comprising sending an indication to the wearable computing device indicating that the physical device has transitioned to the configuration state.

9. The computer-implemented method of claim 1 further comprising determining whether the physical device to be controlled by the user is registered based on registration information stored in a database, wherein the registration information comprises data identifying capabilities of the physical device to be controlled by the user.

10. The computer-implemented method of claim 9 wherein sending the device state information to the wearable computing device comprises sending the device state information responsive to determining that the physical device to be controlled by the user is registered.

11. A mobile device comprising:

a communication interface configured to:

communicate with a wearable computing device worn by a user and co-located with the mobile device; and communicate with a physical device to be controlled by the user via the wearable computing device; and a processing circuit configured to:

classify the physical device to be controlled by the user, wherein the physical device is selected by the user via the wearable computing device and is positioned within a field of view of the user, wherein the wearable computing device is not configured to determine its own geographical location, and wherein to classify the physical device to be controlled the processing circuit is configured to:

determine a geographical location for the mobile device;

compare the geographical location for the mobile device to a pre-provisioned geographical location for the physical device; and classify the physical device to be controlled based on a result of the comparing;

authenticate the user wearing the wearable computing device to control the physical device selected by the user;

query the physical device for device state information;

receive the device state information from the physical device, wherein the device state information comprises information indicating a current state for the physical device and a plurality of user-selectable subsequent states for the physical device, the plurality of user-selectable subsequent states comprising:

a configuration state for modifying a current configuration setting of the physical device; and one or more operating states for controlling a current operational mode of the physical device;

send the device state information to the wearable computing device, wherein the device state information configures the wearable computing device to control a transition of the physical device selected by the user from the current state to the configuration state; and in response to a determination that transition of the physical device to the configuration state has failed, send notification information to the wearable computing device.

12. The mobile device of claim 11 wherein the processing circuit is further configured to:
receive an image of the physical device captured by a camera associated with the wearable computing device;
perform an image analysis on the captured image; and
classify the physical device based on both a result of the image analysis and on the determined geographical location of the wearable computing device.

13. The mobile device of claim 11 wherein the processing circuit is further configured to classify the physical device based on information encoded in a product code associated with the physical device.

14. The mobile device of claim 11 wherein the processing circuit is further configured to classify the physical device based on information carried by a signal transmitted by the physical device.

15. The mobile device of claim 11 wherein the processing circuit is further configured to:
store the device state information as historical data in a memory circuit each time the user selects the physical device to be controlled via the wearable computing device; and
classify the physical device based on the stored historical data associated with devices that have been previously identified.

16. The mobile device of claim 11 wherein the processing circuit is further configured to receive classification information from the wearable computing device, wherein the classification information identifies the physical device.

17. The mobile device of claim 11 wherein the processing circuit is further configured to:
analyze data used to classify the physical device; and
responsive to determining that classification of the physical device has failed:
generate a failure notification indicating that the classification of the physical device has failed; and
send notification information including the failure notification to the wearable computing device worn by the user.

18. The mobile device of claim 17 wherein, if the classification of the physical device has succeeded, the processing circuit is further configured to:
receive a request message comprising a control command from the wearable computing device, wherein the control command is based on one or both of the device state information and the notification information; and
authenticate the user wearing the wearable computing device to control the physical device selected by the user;
responsive to successfully authenticating the user:
generate a control message comprising the control command; and
send the control message comprising the control command to the physical device selected by the user to control the physical device to transition from the current state to the configuration state.

19. The mobile device of claim 18 wherein the processing circuit is further configured to send an indication to the wearable computing device indicating that the physical device has transitioned to the configuration state.

20. A non-transitory computer-readable storage medium comprising computer program code stored thereon that, when executed by a processing circuit of a computing device, configures the processing circuit to:
classify a physical device to be controlled by a user, wherein the physical device is selected by the user via a wearable computing device and is positioned within a field of view of the user, wherein the wearable computing device is not configured to determine its own geographical location, and wherein to classify the physical device to be controlled the processing circuit is configured to:
determine a geographical location for a mobile device co-located with, and communicatively connected to, the wearable computing device;
compare the geographical location for the mobile device to a pre-provisioned geographical location for the physical device; and
classify the physical device to be controlled based on a result of the comparing and based on stored historical data associated with devices that have been previously identified;
authenticate the user wearing the wearable computing device to control the physical device selected by the user;
query the physical device for device state information;
receive the device state information from the physical device, wherein the device state information comprises information indicating a current state for the physical device and a plurality of user-selectable subsequent states for the physical device, the plurality of user-selectable subsequent states comprising:
a configuration state for modifying a current configuration setting of the physical device; and
one or more operating states for controlling a current operational mode of the physical device;
send the device state information to a wearable computing device worn by the user, wherein the device state information configures the wearable computing device to control a transition of the physical device from the current state to the configuration state; and
in response to determining that the transition of the physical device to the configuration state has failed, sending notification information to the wearable computing device.

* * * * *